(12) United States Patent
Khurana et al.

(10) Patent No.: US 11,563,753 B2
(45) Date of Patent: Jan. 24, 2023

(54) SECURITY SURVEILLANCE SYSTEM AND SECURITY SURVEILLANCE METHOD

(71) Applicant: Rohde & Schwarz GmbH & Co. KG, Munich (DE)

(72) Inventors: Hanush Khurana, Singapore (SG); Prabhakaran Ekambaram, Singapore (SG)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 149 days.

(21) Appl. No.: 15/714,175

(22) Filed: Sep. 25, 2017

(65) Prior Publication Data

US 2019/0098022 A1 Mar. 28, 2019

(51) Int. Cl.
| | | |
|---|---|---|
| *H04L 9/40* | (2022.01) | |
| *H04L 43/18* | (2022.01) | |
| *H04L 43/062* | (2022.01) | |
| *H04W 12/12* | (2021.01) | |
| *H04L 43/10* | (2022.01) | |

(52) U.S. Cl.
CPC ........ *H04L 63/1408* (2013.01); *H04L 43/062* (2013.01); *H04L 43/18* (2013.01); *H04L 63/0236* (2013.01); *H04L 63/0245* (2013.01); *H04L 63/20* (2013.01); *H04W 12/12* (2013.01); *H04L 43/10* (2013.01)

(58) Field of Classification Search
CPC ... H04L 63/1408; H04L 43/062; H04L 43/18; H04L 63/0236; H04L 63/0245; H04L 63/20; H04L 43/10; H04W 12/12
USPC ........................................................ 709/224
See application file for complete search history.

(56) References Cited

U.S. PATENT DOCUMENTS

| | | | | |
|---|---|---|---|---|
| 2002/0145981 A1* | 10/2002 | Klinker | ............... | H04L 41/0816 370/244 |
| 2007/0110053 A1* | 5/2007 | Soni | ................... | H04L 63/0263 370/389 |
| 2010/0315950 A1* | 12/2010 | Venkataraman | .... | H04L 43/0882 370/235 |
| 2011/0246753 A1* | 10/2011 | Thomas | ................ | H04L 63/107 713/1 |
| 2012/0015644 A1* | 1/2012 | Danford | ............. | H04L 41/0893 455/419 |
| 2012/0269167 A1 | 10/2012 | Velev et al. | | |
| 2013/0019317 A1* | 1/2013 | Whelan | .............. | H04B 7/18593 726/26 |
| 2013/0143522 A1* | 6/2013 | Rege | ..................... | H04M 15/28 455/405 |

(Continued)

FOREIGN PATENT DOCUMENTS

EP 2949144 A2 * 12/2015 ............ H04W 24/04

*Primary Examiner* — Anh Nguyen
(74) *Attorney, Agent, or Firm* — Westman, Champlin & Koehler, P.A.

(57) ABSTRACT

A security surveillance system for a mobile device with a wireless interface and a control unit that is connected to the wireless interface comprises a security controller that is coupled to the wireless interface and that inspects at least data traffic incoming via the wireless interface at the mobile device according to a number, i.e. one or more, of predefined data rules, wherein the security controller generates a warning signal if the data traffic violates one of the predefined data rules, and a warning indicator that is coupled to the security controller and that generates a warning indication based on the warning signal.

12 Claims, 6 Drawing Sheets

(56) References Cited

U.S. PATENT DOCUMENTS

| | | | |
|---|---|---|---|
| 2013/0219457 A1* | 8/2013 | Touboul | H04L 63/1441 |
| | | | 726/1 |
| 2013/0298230 A1* | 11/2013 | Kumar | G06F 21/52 |
| | | | 726/22 |
| 2013/0347094 A1* | 12/2013 | Bettini | G06F 21/577 |
| | | | 726/11 |
| 2014/0053226 A1* | 2/2014 | Fadida | H04L 67/34 |
| | | | 726/1 |
| 2014/0250296 A1* | 9/2014 | Hansen | H04L 67/14 |
| | | | 713/151 |
| 2014/0331281 A1* | 11/2014 | Bettini | H04L 63/0227 |
| | | | 726/1 |
| 2015/0052580 A1 | 2/2015 | Delsol et al. | |
| 2015/0133082 A1* | 5/2015 | Broch | G06F 21/554 |
| | | | 455/410 |
| 2016/0150439 A1 | 5/2016 | Drevon et al. | |
| 2016/0232108 A1* | 8/2016 | Goss | H04L 63/20 |
| 2016/0292434 A1* | 10/2016 | Nefedov | G06F 21/6245 |
| 2016/0308908 A1* | 10/2016 | Kirby | G06F 21/604 |
| 2016/0323318 A1* | 11/2016 | Terrill | H04L 63/0227 |
| 2016/0337204 A1* | 11/2016 | Dubey | H04L 41/22 |
| 2016/0359912 A1* | 12/2016 | Gupta | H04L 63/1425 |
| 2016/0360300 A1* | 12/2016 | Proud | H02J 50/10 |
| 2017/0048268 A1* | 2/2017 | Rieke | H04L 63/1433 |
| 2017/0078886 A1* | 3/2017 | Raleigh | H04W 12/08 |
| 2017/0126728 A1* | 5/2017 | Beam | H04L 63/14 |

\* cited by examiner

SECURITY SURVEILLANCE SYSTEM AND SECURITY SURVEILLANCE METHOD

TECHNICAL FIELD

The present invention relates to a security surveillance system. The present invention further relates to a respective security surveillance method.

BACKGROUND

Although applicable in principal to any data communication system, the present invention and its underlying problem will be hereinafter described in combination with cellular mobile devices.

Modern data networks provide data communication to a plurality of communication devices. Over the internet millions of nodes may be communicatively coupled and data may be sent from virtually any node to any other node. In such large communication networks malicious nodes may try to attack other nodes and e.g. gain access to the nodes.

It is therefore necessary to provide protection mechanisms in data networks. This is especially true e.g. for private networks, like corporate networks, that may comprise data servers with company confidential data. To prevent attackers from gaining access to such networks for example firewalls may be used that block specific traffic from entering the company network via the internet. A firewall may e.g. block all traffic on a specific tcp port.

Providing the same level of security as in a local network is however much more difficult for mobile devices that may e.g. move from one wireless network to another wireless network.

Against this background, the problem addressed by the present invention is improving security in mobile devices.

SUMMARY

The present invention solves this objective problem by a security surveillance system with the features of claim 1, and a security surveillance method with the features of claim 12.

Accordingly it is provided:

A security surveillance system for a mobile device with a wireless interface and a control unit that is connected to the wireless interface, the security surveillance system comprising a security controller that is coupled to the wireless interface and that inspects at least data traffic incoming via the wireless interface at the mobile device according to a number, i.e. one or more, of predefined data rules, wherein the security controller generates a warning signal if the data traffic violates one of the predefined data rules, and a warning indicator that is coupled to the security controller and that generates a warning indication based on the warning signal.

Further, it is provided:

A security surveillance method for a mobile device with a wireless interface and a control unit that is connected to the wireless interface, the security surveillance method comprising inspecting at least data traffic incoming via the wireless interface at the mobile device according to a number of predefined data rules with a security controller that is coupled to the wireless interface, and generating a warning signal with the security controller if the data traffic violates one of the predefined data rules.

The present invention is based on the finding that in wireless networks it cannot always be made sure that received data is received from an expected source.

In wired networks a central firewall may be provided at the connection point of the network to e.g. the internet. Such a firewall may then monitor all incoming traffic for the wired network. In contrast, wireless devices may e.g. be provided with a connection to a data network via an access point or a base station. Malicious attackers may however spoof the access point or base station and provide malicious data packets to a mobile device.

A spoofed base station in a GSM network may e.g. indicate to mobile devices to turn off the encryption. The communication may then easily be wiretapped.

A central firewall in the wireless network may therefore not serve to monitor traffic of all wireless devices.

The present invention therefore provides the surveillance system with the ability to monitor data traffic that is incoming at the wireless device and provide a respective warning signal if the data traffic is identified as contradicting the predetermined data rules.

The surveillance system is integrated into the mobile device and performs the inspection of the data traffic after it is received via the wireless interface. To this end, the surveillance system comprises the security controller that uses a number of data rules to evaluate the incoming data traffic.

The control unit of the mobile device may e.g. be a processor with a memory that stores an operating software for the processor. The operating software may e.g. be an operating system of the mobile device that is executed by the processor. Such an operating system may provide the functionality for the mobile device to communicate via the wireless interface and for user interaction.

It is understood, that the control unit may e.g. comprise an integrated system on chip that comprises the processor, the memory and e.g. communication controllers in a single chip. It is however also possible that the memory, the communication controllers and other elements in the mobile device like e.g. power management elements are provided as separate devices and are coupled e.g. via digital data lines or data busses to the processor.

The mobile device may e.g. be a cell phone, a smartphone, a WIFI enabled device, like e.g. a laptop or the like. It is understood, that the wireless interface may therefore comprise a GMS, UMTS, LTE or 5G interface or also a WIFI interface, a Bluetooth interface or the like. It is further understood, that the wireless interface may also comprise two or more interfaces, like e.g. a LTE interface, and a WIFI interface, and a Bluetooth interface at the same time. Such multistandard interfaces may for example be provided in smartphones or tablet PCs.

The security controller may intercept the traffic from the wireless interface and perform an analysis of the traffic according to the data rules. The data rules therefore define, which type of data or data traffic is to be qualified as potentially harmful or malicious and allow the security controller to perform a respective qualification of the incoming traffic.

It is understood, that the data rules may be positive or negative data rules. Positive data rules refer to data traffic that is not suspected to be malicious. In contrast, the negative data rules refer to data traffic that is suspected to be malicious. This means that with a positive data rule the security controller will generate the warning signal if incoming data does not conform to the positive data rule. With a negative data rule, the security controller will generate the warning signal if incoming data does conform to the negative data rule.

The data rules may e.g. define source and destination port numbers and/or ranges, and/or source and receiver addresses, and/or IP protocol numbers (TCP, UDP) like trusted or untrusted IP addresses, and/or an IPsec Security Parameter Index (SPI), and/or a Type of Service (TOS), and/or a Flow-Label, and/or application types that cause the traffic like e.g. HTTP, FTP. It is understood, that data rules may be provided that also comprise rules regarding the actual content of the single data packets of the incoming data traffic or for sequences of data packets of the incoming data traffic. This may even comprise depacketizing content and analyzing the depacketized content.

A positive data rule may therefore e.g. define incoming traffic on ports 50-100 from IP address 101.101.101.1. With such a positive rule the security controller would qualify traffic from the source with IP address 101.101.101.1 for ports 50-100 as unsuspicious. In contrast if the same rule is formulated as negative rule, the security controller would qualify traffic from the source with IP address 101.101.101.1 for ports 50-100 as suspicious and potentially harmful.

The data rules may also be provided as so called "traffic flow templates" or TFT, especially if the mobile device is e.g. a cell phone, a smartphone or a tablet PC that uses a 3GPP compliant cell-based network for communication. Such TFT based data rules may e.g. refer to specific data bearers in the communication network or the respective cell. The TFT rules may e.g. be rules according to the definition of the network access stratum, NAS, in the 3GPP 24.008 standard.

It is understood, that the security controller may be configured to work only on positive data rules or only on negative data rules. Set to work only with positive data rules the security controller will qualify all traffic as suspicious or potentially malicious that does not conform to one of the positive rules. In contrast, set to work only with negative data rules, the security controller will only qualify traffic as suspicious or potentially malicious that does conform to one of the data rules.

The security controller may also be set in a mode where data traffic that does neither conform to a positive data rule nor to a negative data rule is qualified as unsuspicious.

After assessing or qualifying the incoming data traffic, the security controller will in case of respective data traffic generate the warning signal. The warning indicator will then provide the warning indication if the warning signal is generated. The warning indication may e.g. be provided directly to a user of the mobile device, e.g. via a dedicated LED or a buzzer or the like. As an alternative, the warning indication may also be provided to the control unit of the mobile device. The control unit may then act accordingly, and e.g. shut down a target application of the malicious data traffic or the like. The control unit may e.g. in case of data traffic that violates one of the data rules provide a user warning, stop any communication via the wireless interface, reboot, shut down the mobile device or stop specific applications. It is also possible to ask the user if the data traffic should be further processed.

The present invention therefore provides a security surveillance system for a mobile device that may be provided directly in the mobile device and may generate a warning indication locally. Remedial actions may then immediately be taken at the mobile device that is currently under attack.

Further embodiments of the present invention are subject of the further subclaims and of the following description, referring to the drawings.

In a possible embodiment, the security controller may comprise a computer program that is executed by the control unit of the mobile device.

As indicated above, the control unit may comprise a processor and a memory that is coupled to the processor and that stores an operating system, i.e. instructions that when loaded and executed by the processor provide the function of the operation system. The memory may together with the operating system store instructions that when executed perform or provide the function of the security controller.

Such a security controller may therefore act on data traffic that is already provided from the wireless interface to the control unit, e.g. demodulated and/or decoded data traffic that is already present as digital data in the control unit.

In the control unit the security controller may then directly act on the digital data without the need to demodulate or decode the data. This means that the security controller may not only access information about the data traffic like the source address, a source port a destination port and the like. Instead the security controller may directly access the content in the data traffic and perform an in depth analysis of the content. Depending on the type of data rules, the content may be an important part of the data traffic that has to be verified.

In a possible embodiment, the security controller may comprise a user space application that is executed by an operating system of the control unit of the mobile device.

User space application in this context refers to an application that is provided as separate program to the operating system and is executed by the operating system, e.g. on request by a user. The main difference between e.g. a hardware driver and a user space application is that the hardware driver is required by the operating system and provides an interface between the operating system and the hardware, while a user space application is loaded on the mobile device and executed by the operating system.

Providing the security controller as user space application allows easily installing the security controller on a mobile device without specifically adapting the hardware or the operating system of the mobile device. Further, updates to the security controller may easily be distributed, e.g. via automatic online updates.

In a possible embodiment, the security controller may comprise a hardware driver for the wireless interface for an operating system of the control unit of the mobile device.

The user space applications are the last applications to receive the incoming data traffic. A vulnerability of the operating system may however be present in functions of underlying layers, e.g. between the hardware and the application. If the incoming data is intercepted and analyzed as early as possible, the analysis may happen before any vulnerabilities of the operating system may be accessed.

The control unit will usually be coupled to the wireless interface via a digital data interface. The wireless interface may e.g. comprise an antenna with RF circuitry and a communication controller that is coupled to the RF circuitry. In the control unit a respective hardware driver may be present that accesses the communication controller of the RF interface via the digital data interface. The hardware driver will also provide respective functions that allow e.g. an operating system of the mobile device to access the wireless interface via the digital data interface or to retrieve data received via the wireless interface and to transmit data via the wireless interface.

The hardware driver will therefore be the first computer program based element of the operating system of the mobile device that gains access to the data received via the wireless interface. Providing the security controller in the hardware driver therefore allows accessing the digital data of the data traffic at the earliest possible state of the signal chain in the operating system.

The security controller may e.g. be provided in the hardware driver as an additional function that performs the respective data analysis prior to providing the incoming data traffic to further elements or functions of the operating system. In a function stack of the hardware driver the analysis function of the security controller may e.g. be provided as additional function of the stack. The hardware driver may further be provided with a function that allows communicating the analysis results to the operating system.

In a possible embodiment, the security controller may comprise a communication stack function of a communication software stack of an operating system of the control unit of the mobile device.

The communication stack in an operating system is a function stack that processes incoming or outgoing data in different layers, e.g. layers according to the OSI layer model or similar.

The security controller may be in any layer that is below the application layer. The layers may comprise the presentation layer, the session layer, the transport layer, the network layer, and the data link layer. Providing the security controller below the application layer prevents the potentially malicious data from reaching the application that it may e.g. exploit to attack the mobile device.

In a possible embodiment, the security controller may comprise a virtual machine that executes at least part of an operating system that is in parallel executed by the control unit of the mobile device.

A virtual machine may comprise a dedicated processing device with respective virtualization functions and an additional virtualization software that allow emulating the hardware of the control unit such that at least part of the operating system of the mobile device may be executed in the virtual machine on the emulated hardware.

The dedicated processing device may e.g. be provided between the wireless interface and the control unit to intercept the incoming data traffic before it reaches the control unit. Respective interfaces may be provided in the dedicated processing device, e.g. an interface to RF circuitry or a controller of the wireless interface and an interface to the control unit.

The security controller may in addition comprise a behavior monitor that is arranged external to the virtual machine, at least external to the virtualization software of the virtual machine. The behavior monitor may be coupled to the virtualization software such that it may inspect and monitor the behavior of software executed in the virtual machine. The coupling may e.g. include the behavior monitor monitoring memory and/or hardware access of the software that is executed in the virtual machine. The behavior monitor may e.g. monitor if a function of the communication stack tries to access memory locations that should not be accessed, e.g. because malicious data traffic tries to cause a buffer overflow in the communication stack or because the data traffic tries to execute restricted functions of the operating system.

With a virtual machine the actual access to hardware and memory is abstracted from the access instructions in the executed software. Any access to memory or hardware, like e.g. interfaces or processor registers, may therefore be monitored externally and analyzed. A virtual machine is therefore especially adequate to monitor the behavior of the communication stack while processing the incoming data traffic.

The part of the operating system that is emulated may at least comprise the communication stack of the operating system. This allows the behavior monitor to monitor the full data path that the incoming data traffic will take in the operating system. Analyzing the behavior of the operating system in view of the incoming data traffic therefore allows verifying that no malicious data is provided to the control unit.

The virtual machine may e.g. forward the data traffic incoming via the wireless interface to the control unit if the data traffic does not violate any of the predefined data rules.

In a possible embodiment, the virtual machine may be provided in the control unit.

The control unit may e.g. comprise a software based virtualization solution that allows providing a virtual machine for the security controller alongside the operating system of the mobile device. The virtual machine may be integrated into the control unit such that the incoming data traffic is first provided to the virtual machine and depending on the analysis result then to the operating system. The virtual machine may e.g. access the hardware, e.g. the interface to a communication controller of the wireless interface, with a dedicated driver that routes the communication through the virtual machine prior to forwarding the traffic to the operating system.

In case that the virtual machine is provided in the control unit the behavior monitor may be a user space application that accesses the virtual machine via respective functions or interfaces of the operating system or the virtual machine.

These functions or interfaces allow the behavior monitor to access the content e.g. of the memory and processor registers of the virtual machine.

In a possible embodiment, the security controller may comprise digital analysis circuitry that may be coupled between a RF circuit of the wireless interface and digital circuitry of the wireless interface or the control unit of the mobile device.

Lately, it has been proven that security vulnerabilities may also be present in the firmware of e.g. communication controllers of wireless interfaces. This means that the security vulnerabilities may even be exploited by respective data traffic that does not reach the control unit of the mobile device. Instead the respective communication controller is directly manipulated such that an attacker may gain access to restricted data.

In such potential scenarios it is therefore necessary to intercept the potentially malicious data traffic before it arrives at the respective communication controller.

This may be achieved by providing the security controller between the RF circuitry of the wireless interface and the digital circuitry of the wireless interface, e.g. between RF filters and the communication controller. Usually, the communication controller will comprise an analog-to-digital converter for coupling to the RF circuitry.

The security controller may therefore e.g. comprise an analog-to-digital converter for coupling to the RF circuitry, and a digital-to-analog converter to provide the analog signal received from the RF circuitry to the communication controller. As alternative, if the communication controller comprises a digital data interface and is usually coupled to the RF circuitry via an external analog-to-digital converter, the security controller may comprise a respective digital interface to provide the communication controller with the data received from the RF circuitry.

The digital analysis circuitry will then analyze the digitized data traffic. To this end, the digital analysis circuitry may implement part of the functions of the communication controller. These functions may e.g. comprise demodulation and decoding functions, as they may also be implemented in the communication controller of the wireless interface. The functions in the digital analysis circuitry may however be implemented differently, e.g. by other programmers with other programming languages or in a configurable logic device, like e.g. an ASIC or a FPGA. This prevents the same vulnerabilities from being present in both, the communication controller and the digital analysis circuitry.

In a possible embodiment, the security controller may controllably block data traffic that violates one of the predefined data rules.

As explained above, the warning indication may be provided to the operating system and also to a user. It may further be possible for the user to select if the respective data traffic should be processed by the operating system.

The security controller may e.g. automatically block data traffic that violates one of the predefined data rules. The security controller may however buffer or store the respective data traffic and forward the data traffic to the control unit if specifically requested to do so.

This may e.g. be useful if a false positive is triggered in the security controller and the user is aware that he is willingly performing the respective communication.

In a possible embodiment, the security surveillance system may comprise an external network emulator that emulates a communication network and controllably transmits data traffic to the mobile device that violates at least one of the data rules.

The security surveillance system as described above may serve to protect the mobile device during normal operation of the mobile device by a user.

In combination with the external network emulator the security surveillance system may in addition serve to verify the functionality of the security controller e.g. during development of the security surveillance system or the mobile device. Especially, if the security controller is at least in part provided as computer program or as software, bugs or errors may be detected by emulating the communication network and provide specific test data traffic that violates at least one of the data rules. A test scenario or test set may also be provided that comprises test data traffic for every single security rule. If errors are detected in the security controller with such development tests, the security controller can easily be adapted accordingly.

A network emulator may e.g. emulate a base station or an access point of a communication network. Generally speaking, the network emulator may emulate a communication partner of a communication network for the mobile device. The network emulator may be used to transmit prepared or programmed data traffic to the mobile device. The network emulator may e.g. comprise a signal generation unit that generates the data traffic in real time e.g. based on specific parameters. As alternative, the signal generation unit may also retrieve a pre-prepared data stream from a memory.

In a possible embodiment, the security controller may comprise a configuration interface for receiving data rules, and a configuration memory for storing the received data rules.

It is understood, that the security controller may ship with a predefined set of data rules. However, the threats that may be relevant for the usage scenario of the mobile device may constantly vary. In addition, new backdoors or bugs may be encountered in the operating software or the hardware of the mobile device.

This leads to changing requirements regarding the data rules for the security controller. The configuration interface may therefore be used to provide updated data rules to the security controller.

The configuration interface may e.g. be an interface to the control unit of the mobile device. The updated data rules may therefore be provided e.g. via an application that is executed on the control unit. Such an application may e.g. download the updated data rules and update the security controller accordingly. The updated data rules may e.g. be manually created in the application or may e.g. be provided by a rule server over the internet. It is understood, that the communication between the application and the rule server may be encrypted.

As alternative or in addition, the configuration interface may use the wireless interface and e.g. receive the data rules from the communication network.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

Figure 1:
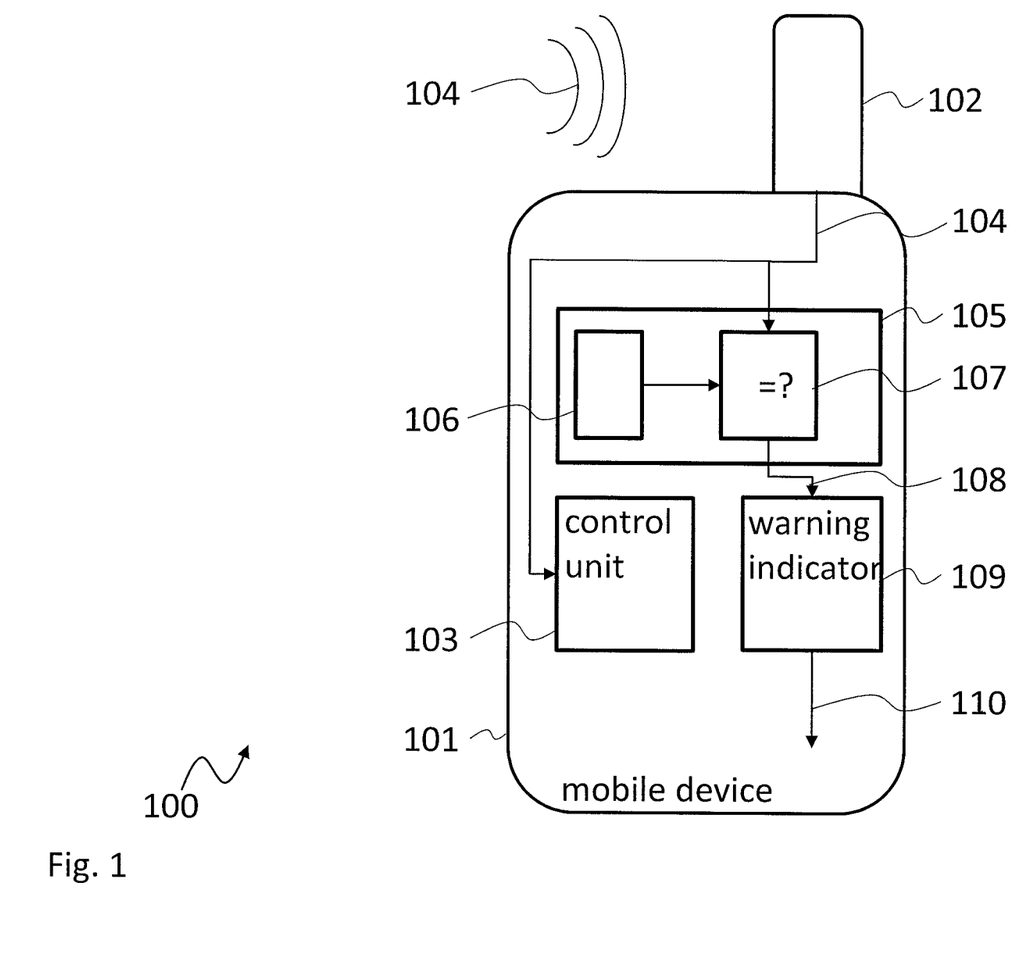
FIG. 1 shows a block diagram of an embodiment of a security surveillance system according to the present invention.

FIG. 1 shows a block diagram of a security surveillance system 100 for a mobile device 101. The mobile device 101 comprises a wireless interface 102 and a control unit 103. The mobile device 101 receives wireless data traffic 104 via the wireless interface 102. The wireless interface 102 provides the data traffic 104 to the control unit 103 for further processing.

The control unit 103 may be seen as the central processing unit of the mobile device 101 that e.g. executes an operating system software for the mobile device 101 and controls further elements of the mobile device 101. Although not explicitly shown, such further elements may e.g. comprise a user interface like a touch screen, input devices like e.g. buttons, and output devices like e.g. LEDs, speakers and the like. It is understood, that further elements may be present in the mobile device 101, like e.g. data memories coupled to the control unit 103 that store e.g. the instructions that form the operating system, driver circuits and the like. It is understood, that the control unit 103 may e.g. comprise a processor and respective peripherals, like e.g. an energy supply, memory elements, peripheral controllers and the like. The control unit 103 may also comprise a system-on-chip that comprises the necessary elements on a single chip.

The security surveillance system 100 comprises the security controller 105 that is coupled to the wireless interface 102 and a warning indicator 109.

During normal operation, the security controller 105 receives the data traffic 104 that is also provided to the control unit 103. It is understood, that although in the security surveillance system 100 the data traffic 104 is provided to the control unit 103 and the security controller 105 in parallel, the data traffic 104 may also be provided first to the security controller 105 and from the security controller 105 to the control unit 103.

The security controller 105 comprises a verification logic 107 that verifies if the data traffic 104 matches at least one of a number of predefined data rules 106. As indicated above, the data rules 106 may either be positive or negative data rules. For processing of the single data rules 106 the verification logic 107 may e.g. comprise one or more state machines. Such state machines may each implement a respective data rule 106. As alternative the data rules 106 may be provided as a description that may be parsed by a respective state machine. It is understood, that the verification logic 107 may also be implemented in any other adequate form. The verification logic 107 may e.g. be implemented in hardware, especially in a configurable logic device, like e.g. a FPGA or a CPLD, or as an ASIC, or in software or as a combination of both.

In case that the data traffic 104 matches one of the data rules 106, the security controller 105, e.g. the verification logic 107, generates a warning signal 108. The warning signal 108 is then provided to the warning indicator 109. The warning indicator 109 then generates a respective warning indication 110. The warning indication 110 may e.g. be a flashing light or a buzzing sound or the like, that may be perceived by the user. The warning indicator 109 may comprise a respective driver.

As alternative, the warning indicator 109 may e.g. be a software component of an operating system that is executed on the control unit 103. Such a warning indicator 109 may then e.g. generate a modal dialog that overlays the main display to indicate to the user that a potentially harmful data traffic 104 was received. The modal dialog may allow a user to accept or discard the respective data traffic 104.

For sake of clarity in the following description of the method based FIG. 2 the reference signs used in the description of the apparatus based figures will be maintained.

Figure 2:
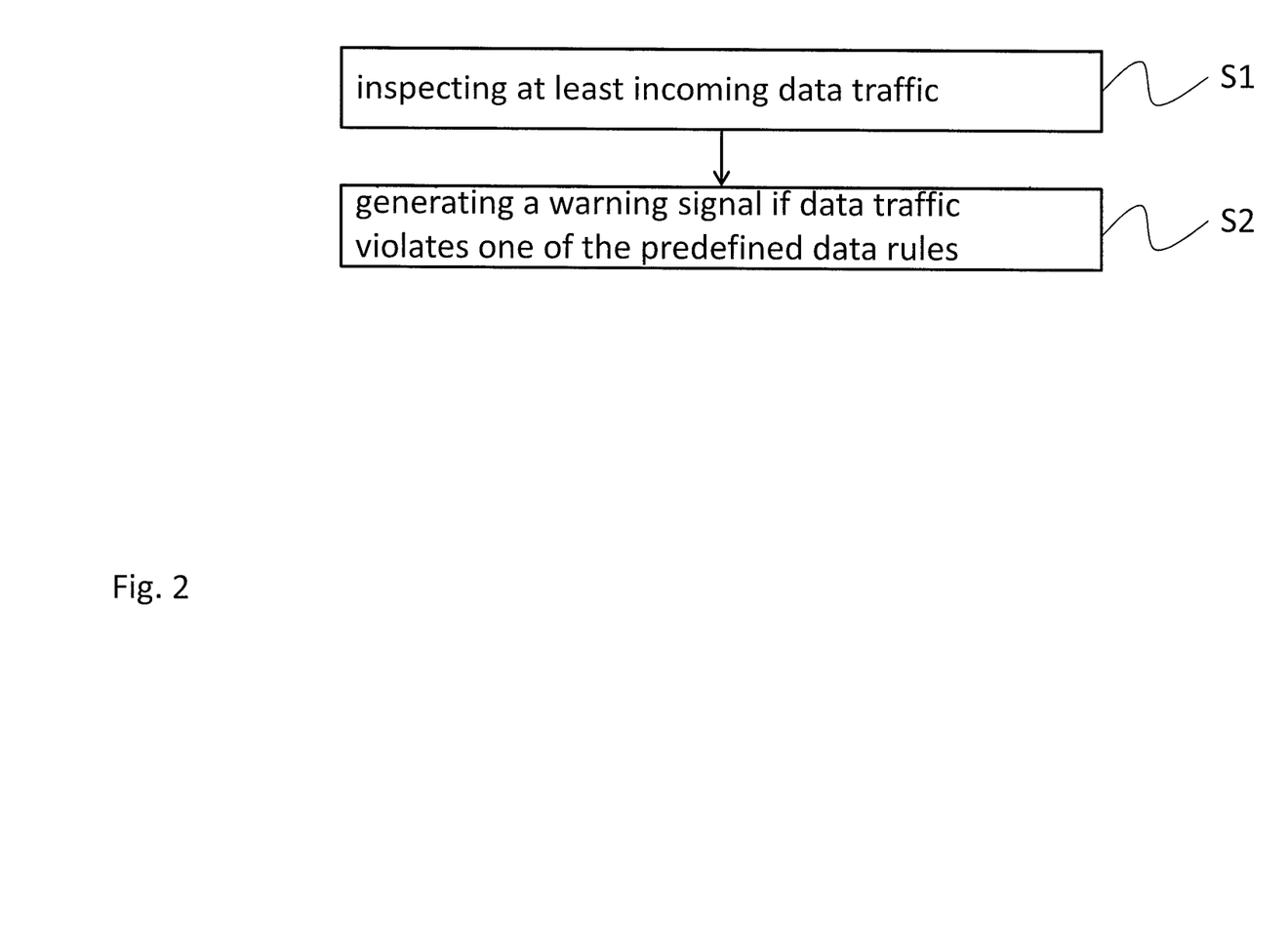
FIG. 2 shows a flow diagram of an embodiment of a security surveillance method according to the present invention.

FIG. 2 shows a flow diagram of an embodiment of a security surveillance method for a mobile device 101, 201, 301, 401, 501 with a wireless interface 102, 202, 302, 402, 502 and a control unit 103, 203, 303, 403, 503 that is connected to the wireless interface 102, 202, 302, 402, 502.

The security surveillance method comprises inspecting at least data traffic 104, 204, 304, 404, 504 incoming via the wireless interface 102, 202, 302, 402, 502 at the mobile device 101, 201, 301, 401, 501 according to a number of predefined data rules 106, 206, 306, 506 with a security controller 105, 205, 305, 405, 505 that is coupled to the wireless interface 102, 202, 302, 402, 502, and generating a warning signal 108, 208, 308, 408, 508 with the security controller 105, 205, 305, 405, 505 if the data traffic 104, 204, 304, 404, 504 violates one of the predefined data rules 106, 206, 306, 506.

If data traffic 104, 204, 304, 404, 504 violates one of the predefined data rules 106, 206, 306, 506 it may in addition to generating the warning indication 110, 210, 310, 510 also be controllably blocked by the security controller 105, 205, 305, 405, 505.

The control unit 103, 203, 303, 403, 503 of the mobile device 101, 201, 301, 401, 501 may e.g. execute a computer program that implements the functionality of the security controller 105, 205, 305, 405, 505. The computer program may e.g. be a user space application 215, 315 that implements the functionality of the security controller 105, 205, 305, 405, 505 and is executed by an operating system of the control unit 103, 203, 303, 403, 503 of the mobile device 101, 201, 301, 401, 501. As an alternative, the computer program may e.g. be a hardware driver for the wireless interface 102, 202, 302, 402, 502 for an operating system of the control unit 103, 203, 303, 403, 503 of the mobile device 101, 201, 301, 401, 501 that implements the functionality of the security controller 105, 205, 305, 405, 505. As further, alternative the security controller 105, 205, 305, 405, 505 may be implemented by a communication stack function of a communication software stack of an operating system of the control unit 103, 203, 303, 403, 503 of the mobile device 101, 201, 301, 401, 501. It is further possible, to distribute the functionality of the security controller 105, 205, 305, 405, 505 in different components of the operating system.

At least part of the functionality of the security controller 105, 205, 305, 405, 505 may also be implemented by a virtual machine 318 that executes at least part of an operating system that is in parallel executed by the control unit 103, 203, 303, 403, 503 of the mobile device 101, 201, 301, 401, 501. The part of the operating system that is executed by the virtual machine 318 may e.g. be a part of the communication stack of the operating system.

The virtual machine 318 may be implemented on a dedicated processing unit. As alternative, the virtual machine 318 may be provided in the control unit 103, 203, 303, 403, 503.

The security controller 105, 205, 305, 405, 505 may also comprise digital analysis circuitry 107, 207, 307, 507 that is coupled between a RF circuit of the wireless interface 102, 202, 302, 402, 502 and digital circuitry of the wireless interface 102, 202, 302, 402, 502 or the control unit 103, 203, 303, 403, 503 of the mobile device 101, 201, 301, 401, 501.

The security surveillance method may further comprise emulating a communication network and controllably transmitting data traffic 104, 204, 304, 404, 504 to the mobile device 101, 201, 301, 401, 501 that violates at least one of the data rules 106, 206, 306, 506 with an external network emulator 530.

Finally, the security controller 105, 205, 305, 405, 505 may comprise a configuration interface for receiving data rules 106, 206, 306, 506, and a configuration memory for storing the received data rules 106, 206, 306, 506.

Figure 3:
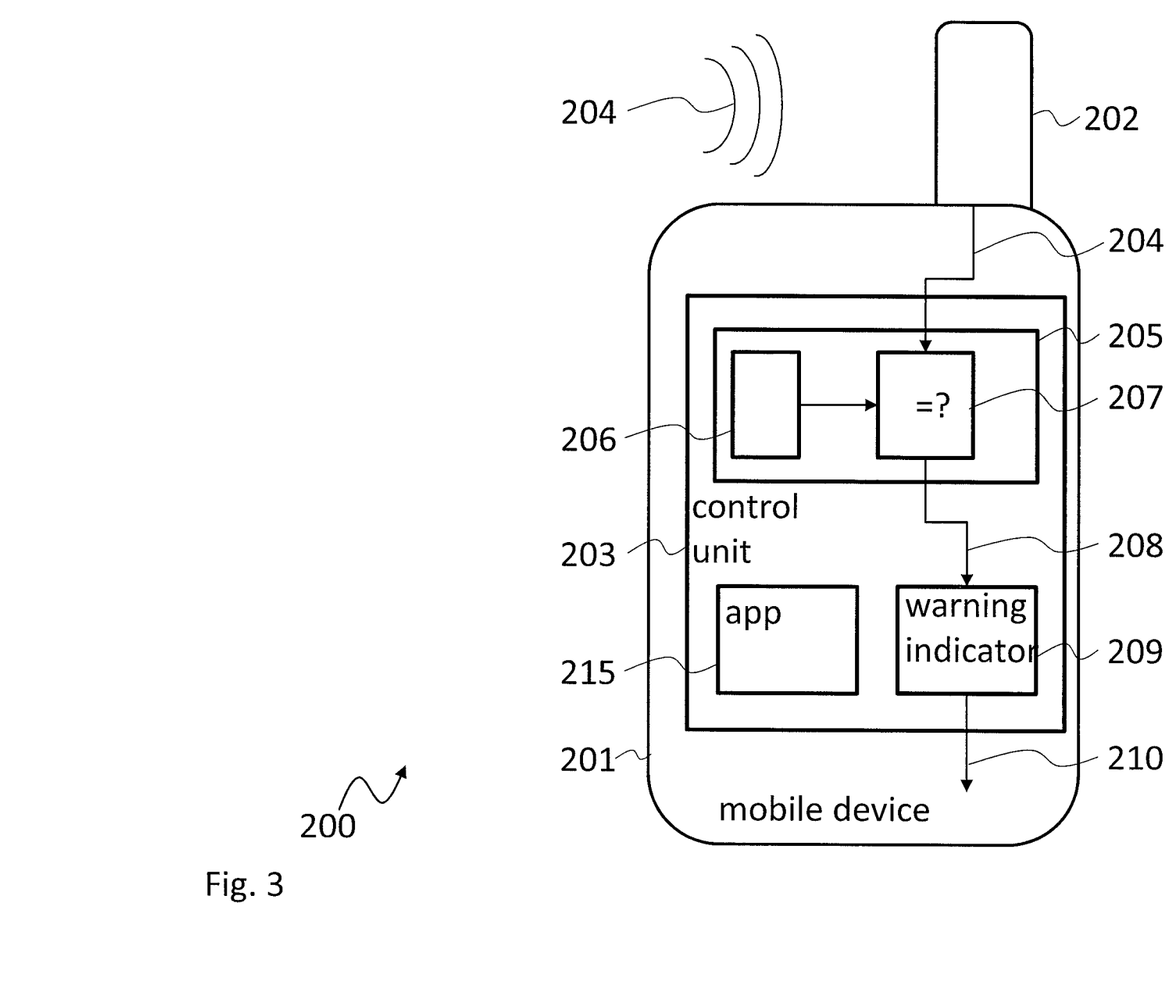
FIG. 3 shows a block diagram of another embodiment of a security surveillance system according to the present invention.

FIG. 3 shows a block diagram of a security surveillance system 200. The security surveillance system 200 is based on the security surveillance system 100. However, in the security surveillance system 200 the security controller 205 is implemented as a software component 205 that is executed by the control unit 203 of the mobile device 201. The data traffic 204 may therefore be directly provided from the wireless interface 202 to the control unit 203, where the data traffic 204 is provided to the security controller 205.

Although not explicitly shown, it is understood, that the control unit 203 may comprise an operating system that executes the security controller 205 as an application, e.g. a user space application. It is however understood, that the security controller 205 may also be implemented in the operating system e.g. as a hardware driver of the operating system or as a component of a communication stack in the operating system. It can be seen, that the control unit 203, or the operating system, may also execute further applications 215.

Figure 4:
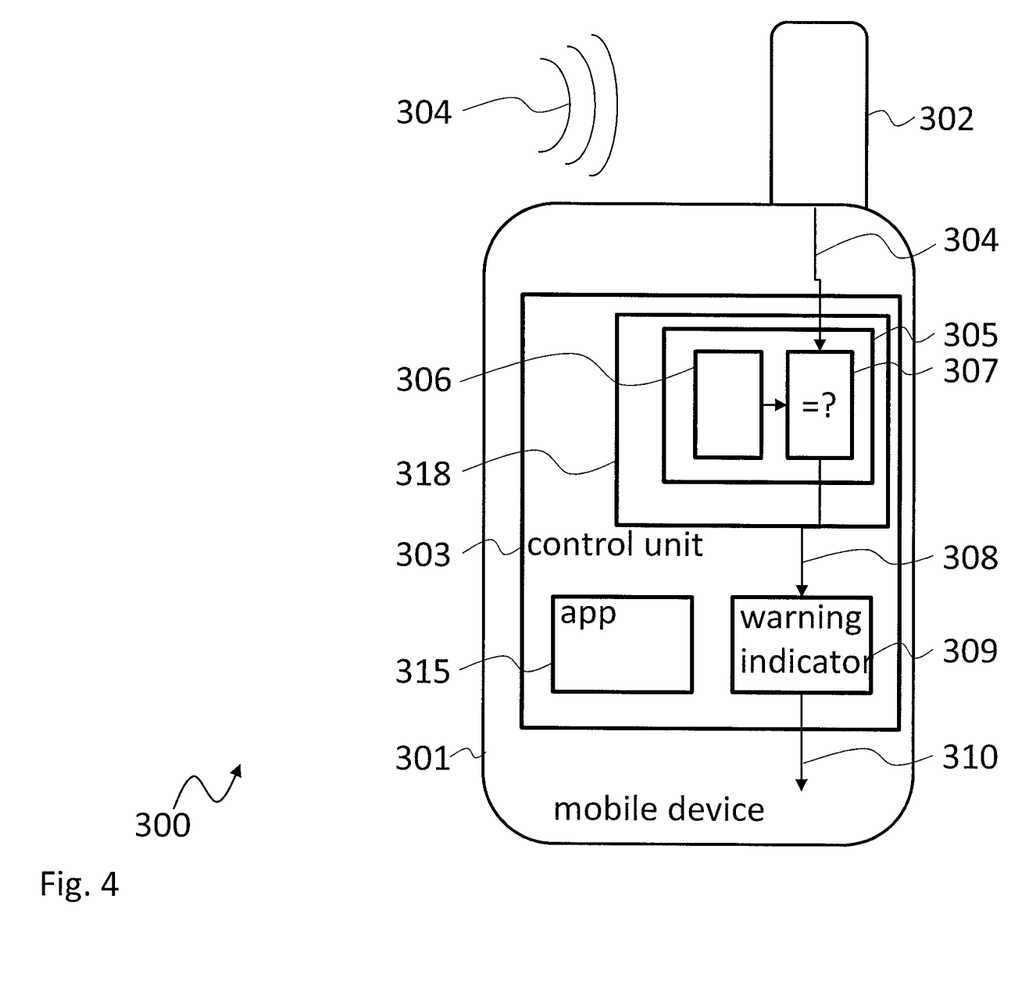
FIG. 4 shows a block diagram of another embodiment of a security surveillance system according to the present invention.

FIG. 4 shows a block diagram of another security surveillance system 300. The security surveillance system 300 is based on the security surveillance system 200. In contrast to the security surveillance system 200, the security surveillance system 300 implements the security controller 305 inside of a virtual machine 318. The virtual machine 318 is shown as being executed inside of the control unit 303. This means, that the control unit 303 may e.g. comprise a dedicated processing core for executing the virtual machine 318. As an alternative, the control unit 303 may execute the virtual machine 318 as an application within the operating system of the control unit 303.

It is understood, that the virtual machine 318 may also be implemented on a dedicated processing device. This implementation totally separates the virtual machine 318 from the control unit 303. Security is therefore increased, because the data traffic 304 is analysed in the dedicated processing device and may not directly try to attack the control unit 303.

Figure 5:
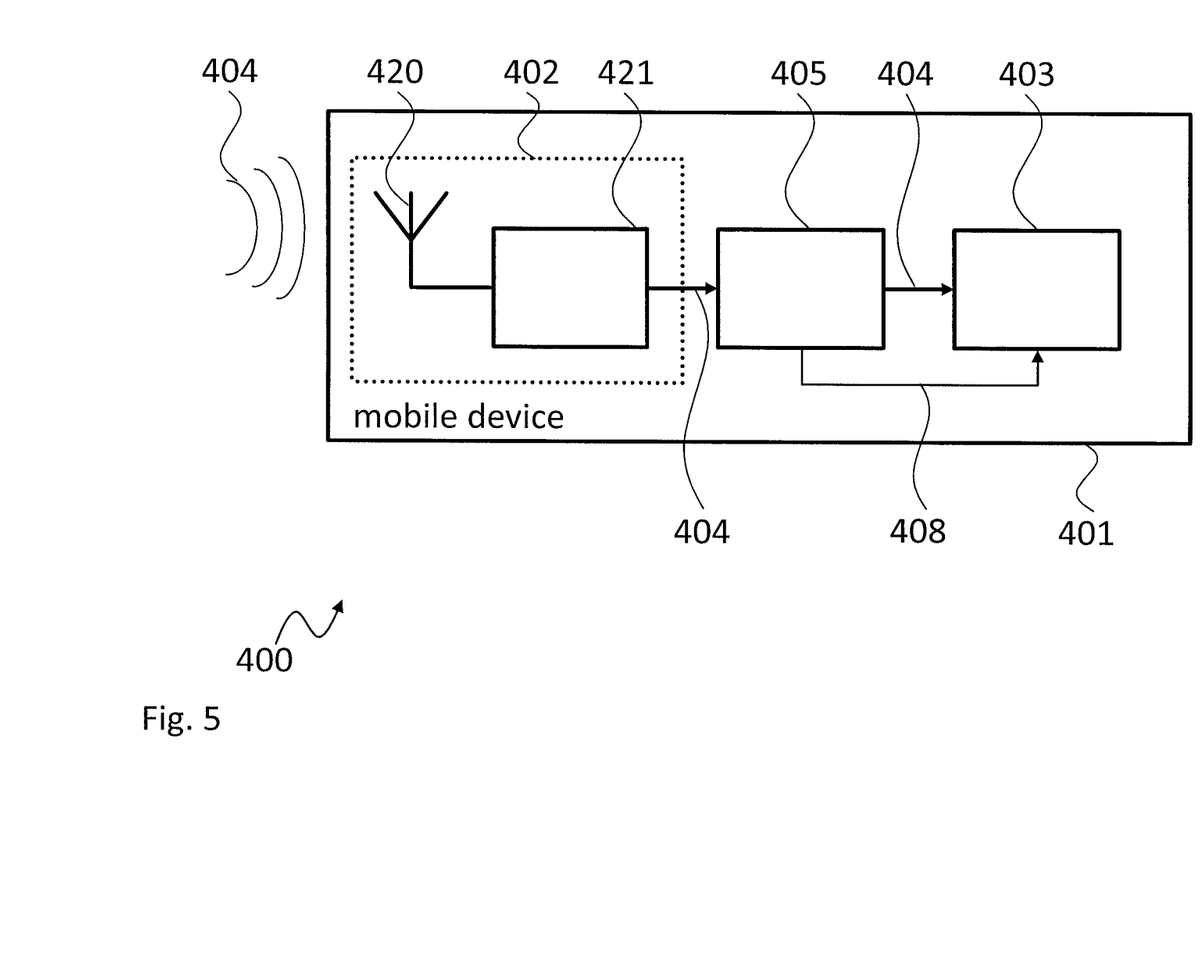
FIG. 5 shows a block diagram of another embodiment of a security surveillance system according to the present invention.

FIG. 5 shows a block diagram of another security surveillance system 400. In the security surveillance system 400 the security controller 405 is implemented as dedicated device, e.g. as ASIC, FPGA or the like, that is connected between the wireless interface 402 and the control unit 403. The wireless interface 402 comprises an antenna 420 that receives the data traffic 404 and a communication controller 421 that processes the incoming wireless signals of the data traffic 404.

The security controller 405 may intercept the data traffic 404 that is provided from the communication controller 421 to the control unit 403. This means that the security controller 405 may analyze the control unit 403 according to the data rules prior to forwarding the data traffic 404 to the control unit 403. This arrangement allows the security controller 405 to provide the warning signal 408 to the control unit 403 prior to forwarding potentially harmful data traffic 404 to the processing unit 403. The processing unit 403 may e.g. ask a user if the data traffic 404 should be forwarded or not and instruct the security controller 405 accordingly.

In the security surveillance system 400 the security controller 405 is arranged between the communication controller 421 and the security controller 405. It is however understood, that the security controller 405 may also be arranged between the antenna 420 and the communication controller 421. In this case the security controller 405 may comprise respective converters that allow the security controller 405 to process the analog signals that are received by the antenna 420.

Figure 6:
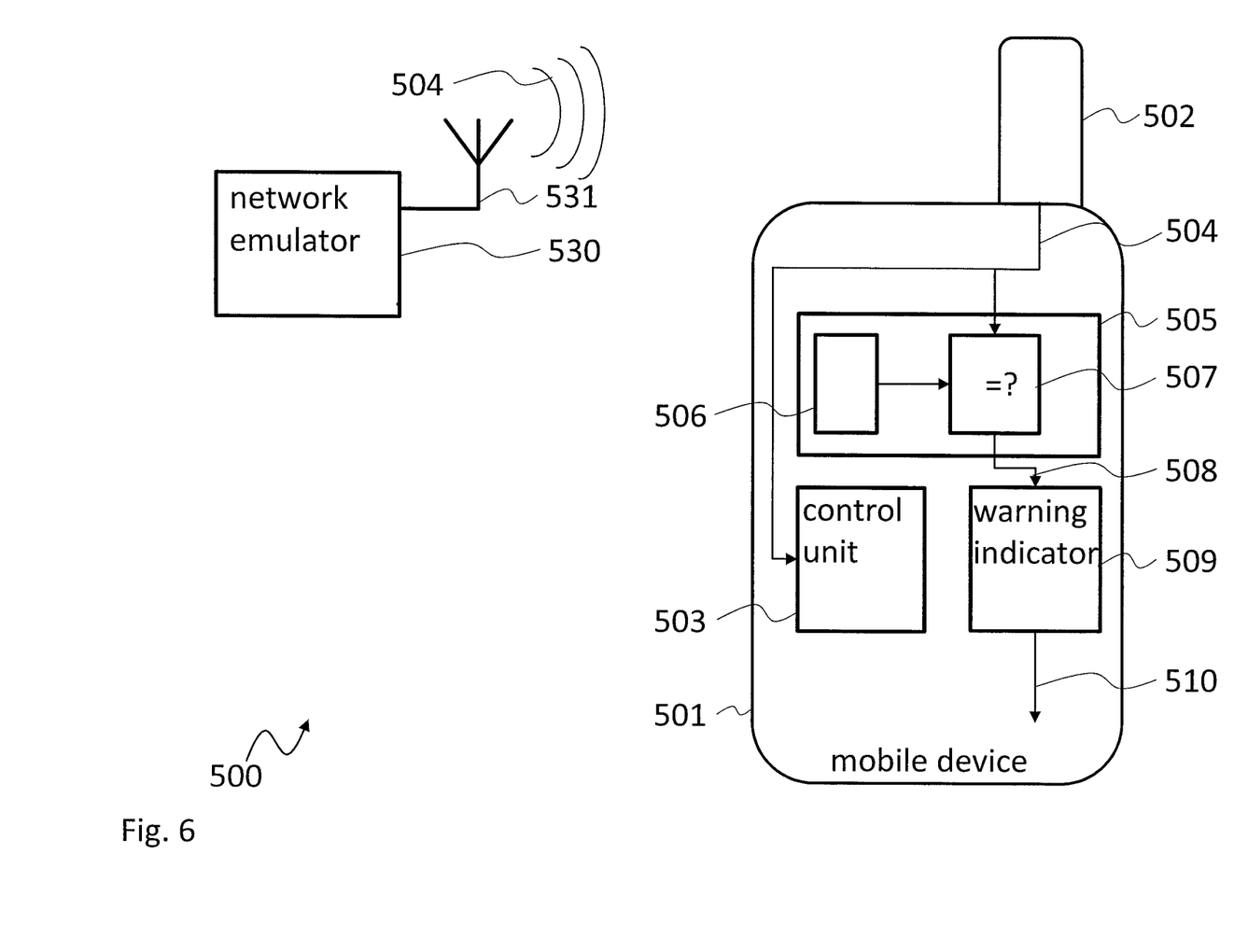
FIG. 6 shows a block diagram of another embodiment of a security surveillance system according to the present invention.

FIG. 6 shows a block diagram of an embodiment of a security surveillance system 500. The security surveillance system 500 comprises an exemplary mobile device 501 as it is also shown in FIG. 1. It is understood, that any other embodiment of the mobile device according to the present invention may be used. Further, the security surveillance system 500 comprises a network emulator 530 with an antenna 531 for emitting data traffic 504. The network emulator 530 may e.g. emit data traffic 504 that emulates a malicious data source and provides data traffic 504 that violates at least one of the predefined data rules.

The combination of the security controller 505 in the mobile device 501 and the network emulator 530 allows performing extensive testing of the functionality of the mobile device 501 and the security controller 505.

It is for example possible to provide data traffic 504 that specifically triggers the warning signal 508 for specific data rules. It may then be verified if the mobile device 501 provides the respective warning indication 510.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS

100, 200, 300, 400, 500 security surveillance system
101, 201, 301, 401, 501 mobile device
102, 202, 302, 402, 502 wireless interface
103, 203, 303, 403, 503 control unit
104, 204, 304, 404, 504 data traffic
105, 205, 305, 405, 505 security controller
106, 206, 306, 506 data rules
107, 207, 307, 507 verification logic
108, 208, 308, 408, 508 warning signal
109, 209, 309, 509 warning indicator
110, 210, 310, 510 warning indication
215, 315 application
318 virtual machine
420 antenna
421 communication controller
530 network emulator
531 antenna
S1, S2 method steps

The invention claimed is:

1. A security surveillance system for a mobile device with a wireless interface and a control unit that is connected to the wireless interface and that controls further elements of the mobile device based on wireless data traffic received by the wireless interface, the security surveillance system comprising:
   a security controller included in the mobile device, wherein the security controller is implemented as a dedicated device and the security controller is coupled to the wireless interface, and the security controller receives the data traffic provided to the control unit and inspects at least the received data traffic incoming via the wireless interface at the mobile device according to a number of predefined data rules, wherein the security controller generates a warning signal if the data traffic violates one of the predefined data rules, and
   a warning indicator that is coupled to the security controller and that generates a warning indication based on the warning signal,
   wherein the security controller comprises a virtual machine with a dedicated processing device for emulating hardware of the control unit, said virtual machine executes at least part of an operating system that is in parallel executed by the control unit of the mobile device, and
   wherein the security controller comprises a behavior monitor that is arranged external to the virtual machine, and configured to inspect and monitor a behavior of software executed in the virtual machine in view of the received data traffic incoming via the wireless interface,
   wherein the security controller is arranged between an RF circuit of the wireless interface and a digital interface of the wireless interface such as to intercept the data traffic before it arrives at the digital interface of the wireless interface, and wherein the security controller comprises an analog-to-digital converter for coupling the security controller to the RF circuit, a digital analysis circuity coupled between the RF circuit and the digital interface to analyze the digitized data traffic such to controllably block data traffic that violates one of the predefined data rules, and a digital-to-analog converter to provide an analog signal received from the RF circuit to the digital interface of the wireless interface,
   wherein the security surveillance system further comprises an external network emulator that emulates a communication network and controllably transmits data traffic to the mobile device that violates at least one of the data rules.

2. The security surveillance system of claim 1, wherein the security controller comprises a computer program that is executed by the control unit of the mobile device.

3. The security surveillance system of claim 2, wherein the security controller comprises a hardware driver for the wireless interface for an operating system of the control unit of the mobile device.

4. The security surveillance system of claim 2, wherein the security controller comprises a communication stack function of a communication software stack of an operating system of the control unit of the mobile device.

5. The security surveillance system of claim 1, wherein the virtual machine is provided in the control unit.

6. The security surveillance system of claim 1, wherein the security controller comprises a configuration interface for receiving data rules, and a configuration memory for storing the received data rules.

7. A security surveillance method for a mobile device with a wireless interface and a control unit that is connected to the wireless interface and that controls further elements of the mobile device based on wireless data traffic received by the wireless interface, the security surveillance method comprising:
   receiving the data traffic provided to the control unit by a security controller,
   inspecting, by the security controller, at least the received data traffic incoming via the wireless interface at the mobile device according to a number of predefined data rules with a security controller that is coupled to the wireless interface, and generating a warning signal with the security controller if the data traffic violates one of the predefined data rules,
   wherein the security surveillance method is executed in the mobile device,
   wherein the security controller is implemented as a dedicated device,
   wherein the security controller is arranged between an RF circuit of the wireless interface and a digital interface of the wireless interface such as to intercept the data traffic before it arrives at the digital interface of the wireless interface, and wherein the security controller comprises an analog-to-digital converter for coupling the security controller to the RF circuit, a digital analysis circuity coupled between the RF circuit and the digital interface to analyze the digitized data traffic such to controllably block data traffic that violates one of the predefined data rules, and a digital-to-analog converter to provide an analog signal received from the RF circuit to the digital interface of the wireless interface;
   wherein a virtual machine comprises a dedicated processing device for emulating hardware of the control unit, said virtual machine executes at least part of an operating system that is in parallel executed by the control unit of the mobile device implements the functionality of the security controller, and
   wherein a behavior monitor of the security controller that is arranged external to the virtual machine inspects and monitors a behavior of software executed in the virtual machine in view of the received data traffic incoming via the wireless interface, wherein the security surveillance method further comprises emulating a communication network and controllably transmitting data traffic to the mobile device that violates at least one of the data rules.

8. The security surveillance method of claim 7, wherein the control unit of the mobile device executes a computer program that implements the functionality of the security controller.

9. The security surveillance method of claim 8, wherein a hardware driver for the wireless interface for an operating system of the control unit of the mobile device implements the functionality of the security controller.

10. The security surveillance method of claim 8, wherein the security controller is implemented by a communication stack function of a communication software stack of an operating system of the control unit of the mobile device.

11. The security surveillance method of claim 7, wherein the virtual machine is provided in the control unit.

12. The security surveillance method of claim 7, wherein the security controller comprises a configuration interface for receiving data rules, and a configuration memory for storing the received data rules.

\* \* \* \* \*